Oct. 13, 1964     A. D. MAURY ETAL     3,152,771
FISHING REEL
Filed Feb. 2, 1960     3 Sheets-Sheet 1
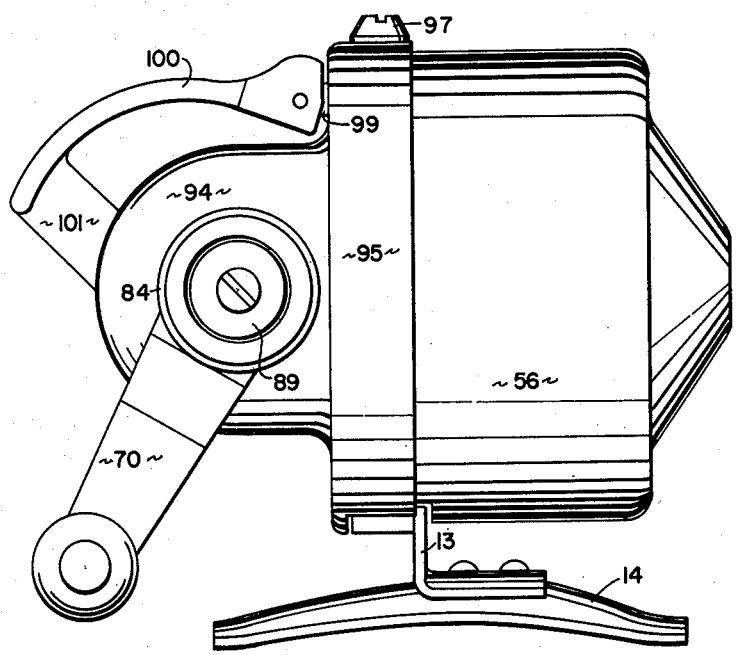
FIG_1_
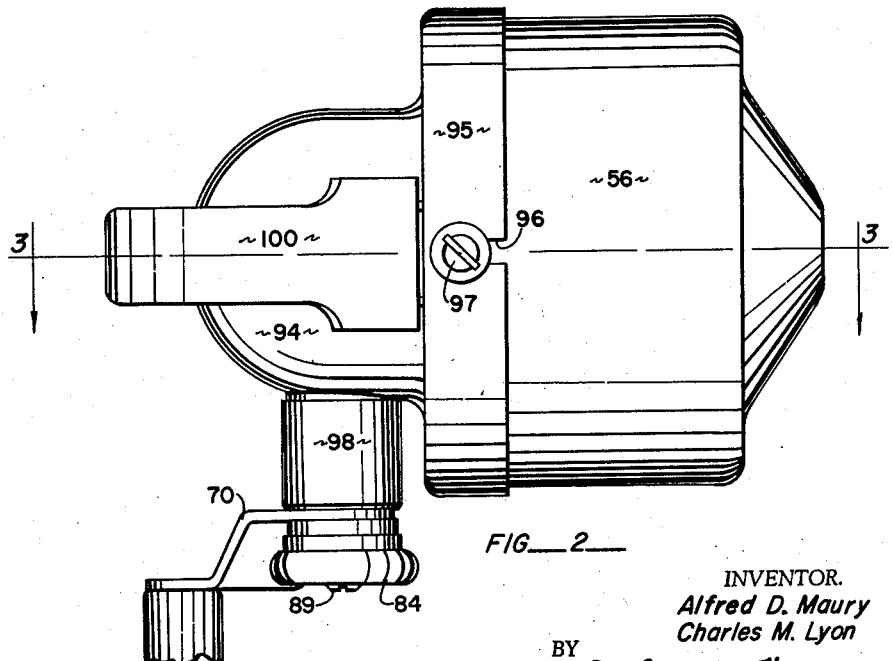
FIG_2_
INVENTOR.
*Alfred D. Maury*
*Charles M. Lyon*
BY
*D. Emmett Thompson*
ATTORNEY

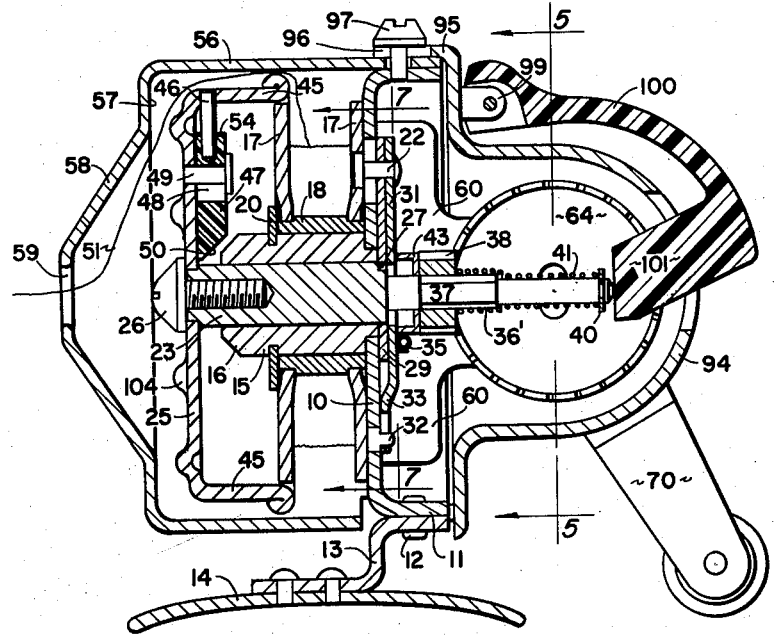
Oct. 13, 1964 A. D. MAURY ETAL 3,152,771
FISHING REEL
Filed Feb. 2, 1960 3 Sheets-Sheet 2
FIG_3_
FIG_4_
INVENTOR.
Alfred D. Maury
Charles M. Lyon
BY
D. Emmett Thompson
ATTORNEY Oct. 13, 1964  A. D. MAURY ETAL  3,152,771
FISHING REEL
Filed Feb. 2, 1960  3 Sheets-Sheet 3
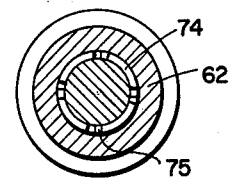
FIG_9_
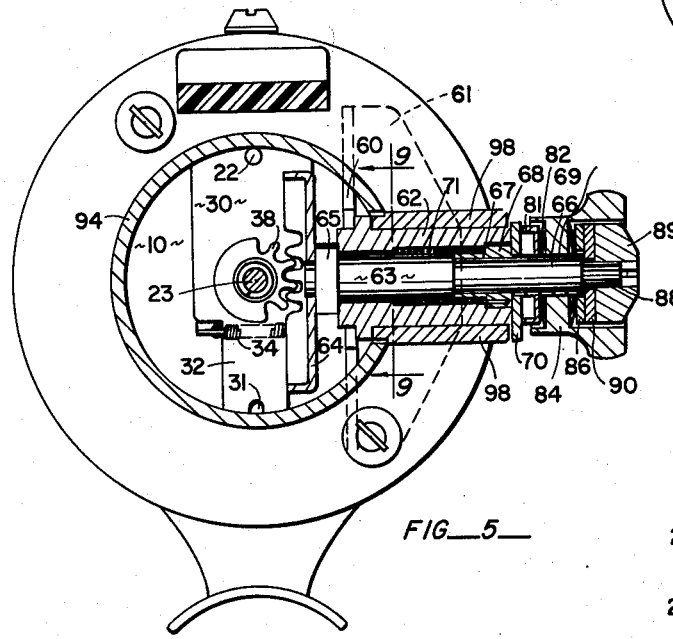
FIG_5_
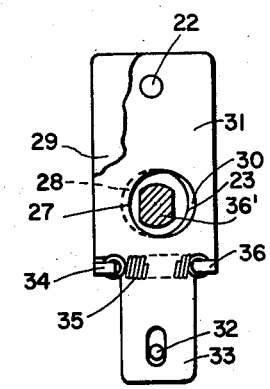
FIG_7_
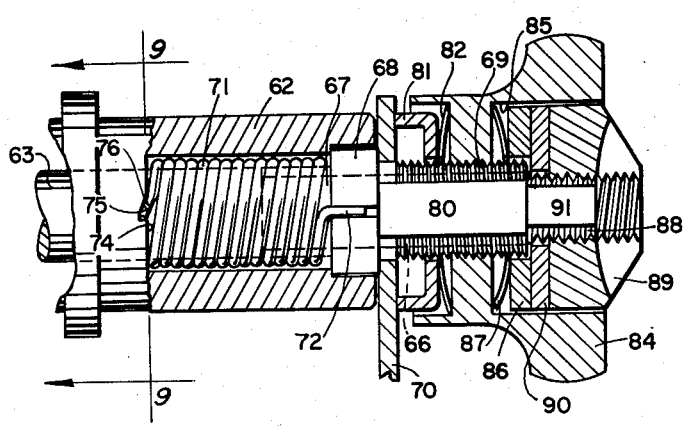
FIG_8_
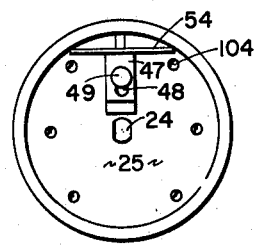
FIG_6_
INVENTOR.
Alfred D. Maury
Charles M. Lyon
BY
D. Emmett Thompson
ATTORNEY 3,152,771
FISHING REEL
Alfred D. Maury, Ilion, and Charles M. Lyon, Mohawk, N.Y., assignors to Martin Automatic Fishing Reel Co., Inc., Mohawk, N.Y., a corporation of New York
Filed Feb. 2, 1960, Ser. No. 6,156
4 Claims. (Cl. 242—84.2)

Our invention has to do with fishing reels of the spinning type in which the line spool is fixedly mounted in the reel against rotation. The line peels or pays off the spool in a direction axially thereof and is wound on the spool by a line pick-up rotated about the axis of the spool.

An object of this invention is to provide for snubbing the line by the pick-up member to stop further pay-off of the line from the spool, the arrangement providing for the snubbing of the line without exerting any squeezing pressure on the line.

The invention has as a further object a unique drive arrangement between the operating crank and the line pick-up assembly which provides for the direct transmission of torque to the pick-up member upon rotation of the crank forwardly in reeling the line onto the stationary spool, and further provides a frictional drag on the pick-up assembly when the same is rotated in reverse direction by the line being taken off from the spool by a hooked fish, the magnitude of the frictional drag being conveniently adjustable in such manner that the reel is operated by one hand.

The invention consists in the novel features and in the combinations and constructions hereinafter set forth and claimed.

In describing this invention, reference is had to the accompanying drawings in which like characters designate corresponding parts in all the views.

In the drawings—

FIGURE 1 is a side elevational view of the reel embodying our invention.

FIGURE 2 is a top plan view of the reel.

FIGURE 3 is a vertical sectional view taken on line 3—3, FIGURE 2.

FIGURE 4 is a view, similar to FIGURE 3, illustrating the pick-up member being moved forwardly in line snubbing position.

FIGURE 5 is a view taken on line 5—5, FIGURE 3.

FIGURE 6 is a view of the pick-up member looking to the left, FIGURE 3.

FIGURE 7 is a view taken on line 7—7, FIGURE 3.

FIGURE 8 is an enlarged view of the structure shown in the right portion of FIGURE 5 with parts in elevation and parts in section.

FIGURE 9 is a view taken on line 9—9, FIGURE 8.

The frame of the reel consists of a cup-shaped member 10 having a rearwardly extending cylindrical flange 11 secured, as by rivets 12, to a Z-shaped bracket 13 affixed to a tang 14 by which the reel is mounted on the fishpole. A sleeve bearing 15 is fixedly secured at one end to the frame plate 10 and extends forwardly therefrom, and the forward end of the sleeve bearing is formed with a conical surface 16. The line spool consists of a pair of side flanges 17 fixed to a hub 18 which is positioned on the bearing sleeve 15 and is held thereon against the frame plate 10 by a snap ring 20, see FIGURE 3. The line spool is fixed against rotation as, for example, by the inner flange 17 of the spool being apertured to receive the head of a rivet 22 mounted in the frame plate 10.

A pick-up drive shaft 23 is mounted in the bearing bushing 15 and has both axial and rotative movement therein. The forward end portion of the shaft 23 is of non-circular form for the reception of a complemental aperture 24 formed in the discoidal portion 25 of the pick-up member, the member being detachably affixed to the forward end of the shaft 23, as by a screw 26. The shaft 23 is relieved on one side, intermediate its ends, to form a curved surface 27 spaced inwardly from the periphery of the shaft to provide a shoulder 28 extending substantially 180° of arc, see FIGURE 7. In an axial direction, the relieved surface 27 is comparable to the thickness of a latch plate 29 formed with an aperture 30 slightly larger than the diameter of the shaft and through which the shaft extends. The latch plate 29 is pivotally mounted at its upper end on the rivet 222 and is overlaid by a plate 31 also carried at its upper end by the rivet 22 and fixed against pivotal movement thereabout by a rivet 32 extending through an aperture in the offset lower portion 33 of the plate. With this arrangement, the latch plate 29 is mounted intermediate the frame wall 10 and the fixed plate 31, and has lateral swinging movement about the pivot 22. The latch plate 29 is formed with a rearwardly extending ear 34 to which one end of a tension spring 35 is attached, the opposite end being attached to an ear 36 formed on the fixed plate 31. With this arrangement, when the shaft 23 is moved forwardly to bring the relieved portion 27 of the shaft in registration with the latch plate 29, the latch plate will be moved about its pivot 22 to the right behind the shoulder 28, whereby holding the shaft against rearward axial movement, as shown in FIGURES 3 and 7. Movement of the latch plate 29 under the influence of spring 35 is limited by ear 34 engaging the fixed plate 31, see FIGURE 7, as when the shaft 23 is pressed all the way in to provide for snubbing the line as shown in FIGURE 4.

Such lateral movement of latch plate 29 by spring 35 is so limited by ear 34 as to position the left side of the aperture 30, FIGURE 7, a slight distance radially outward from the eccentric surface 27. Accordingly, when the shaft is pressed forwardly, as shown in FIGURE 4, the latch plate at the left side of the aperture 30 will be positioned to be engaged by the shoulder formed by the reduced rear portion 36' of the shaft when the shaft is moved rearwardly. The shaft is then latched in that position. If the shaft is rotated to bring the eccentric portion 27 in juxtaposition to the left side of the aperture, the shaft may then move rearwardly until the shoulder 28 engages the plate. If thereupon the shaft is further rotated, the eccentric portion 27 will cam the latch plate to the left to bring the aperture 30 in registration with the forward portion 23 of the shaft, permitting it to be moved to rearward position by the spring 41.

Rearwardly of the shoulder 28, the shaft 23 is formed with a reduced portion 36' which is also formed with flattened areas 37 on opposite sides to slidably receive a pinion gear 38, formed with a non-circular bore for engaging the flattened areas 37, whereby the pinion 38 is slidably mounted on the shaft but fixed against rotation relative thereto. A snap ring 40 is fixed to the rear end of the shaft and a compression spring 41 is interposed between the snap ring and the pinion gear 38 for maintaining the gear against a cup-shaped spacing collar 43 abutting against the plate 31.

The discoidal portion 25 of the pick-up member is formed with a cylindrical flange 45 extending rearwardly toward the line spool. The flange 45 is apertured to slidably receive a pick-up pin 46 which is disposed radially, the inner end of the pin being mounted in a block 47 formed with an elongated aperture 48 to receive a mounting rivet 49 fixed in the front wall 25 of the pick-up member. The inner end of the block is formed with an inclined surface 50 for engagement with the conical end surface 16 on bearing 15 when the shaft 23 is in rearward position. This engagement by the block with the conical surface 16 urges the pick-up pin outwardly through the flange 45 to engage the line 51 extending from the line spool. When the shaft 23 is urged forwardly and latched in forward position, as shown in FIGURE 3, the cam block 47 is positioned out of engagement with the conical bearing surface 16 and the pin and block are urged inwardly by a leaf spring 54 so that the line may pay freely off from the spool for casting. However, upon rotation of the shaft 23, the cam latch plate 29 is cammed away from the shoulder 28, by the eccentric surface 27, bringing the aperture 30 in the plate 29 in register with the inner portion 23 of the shaft, permitting the shaft to move rearwardly by the action of spring 41, and upon continued rotation of the shaft the pin 46, then projecting radially from the flange 45, engages the line and lays it back onto the line spool in the conventional manner. The spool and pick-up mechanism are enclosed by a cylindrical casing 56 formed with a front wall having an annular surface 57 merging with a conical portion 58 formed with a line aperture 59.

A bracket 60 has a flange 61 attached to the rear surface of the frame plate 10. This bracket has fixedly secured to it a bearing 62 extending perpendicular to the axis of the shaft 23, see FIGURE 5. The inner end of the bearing 62 is bored to rotatably receive a drive shaft 63, to the inner end of which is fixedly secured a gear 64 meshing with the pinion 38.

The shaft 63 is formed with an enlargement 65 abutting against the inner end of the bearing sleeve 62. The shaft 63 has an intermediate portion 66 of reduced diameter, on which is rotatably mounted a crank sleeve having an inner cylindrical portion 67, the outer diameter of which is substantially the same as the adjacent inner portion of the shaft 63. This sleeve has an enlarged cylindrical portion 68 interposed between the inner portion 67 and the outer cylindrical portion 69 which is threaded externally.

A crank arm 70 is mounted on the portion 69 against the enlarged portion 68 and is fixedly secured thereto. The outer portion of the bearing sleeve 62 is formed with an enlarged bore to receive a close wound torsion spring 71 which encircles a substantial portion of the shaft 63 and the cylindrical portion 67 of the crank sleeve. This arrangement is best shown in FIGURE 8. The outer end of the spring 71 is bent, as at 72, in an axial direction and is positioned in an axial slot formed on the intermediate enlarged portion 68 of the crank sleeve, whereby that end of the spring is fixed to the sleeve. The shoulder 74, formed at the bottom of the counterbore in the bearing 62, is formed with one or more notches 75, see FIGURES 8 and 9. The inner end 76 of the spring is bent to incline toward bearing shoulder 74 and the notches 75 are inclined at a comparable angle whereby, when the sleeve and spring 71 are rotated in a forward direction, a frictional drag is applied to this inner end of the spring, causing the spring to constrict radially into gripping engagement with the shaft 63 to effect a positive or direct drive thereto from the crank sleeve for rotating the pick-up assembly to re-lay the line onto the spool.

However, upon reverse rotation of the sleeve and spring 71, the inner end 76 of the spring interlocks in one of the notches 75 whereby the spring is restrained against reverse rotation. However, upon release of the crank, the spring 71 expands away from the shaft against the counterbore of the sleeve 62, permitting the shaft 63 to be rotated in reverse direction, as when a fish has taken the hook and is paying the line outwardly off from the spool and thereby effecting reverse rotation of the pick-up assembly and shafts 23 and 63.

An arrangement is provided for imparting a variable frictional drag on such reverse rotation of the shaft 63. The outer cylindrical portion 69 of the crank sleeve is formed with flattened surfaces 80 on opposite sides. A cup-shaped spacer 81 is positioned on this portion of the sleeve and abuts against the crank arm 70. A dished spring washer 82 is positioned upon the portion 69 of the crank sleeve intermediate the spacing collar 81 and a nut 84 threaded on the crank sleeve. The outer end of this nut is formed with a large counterbore 85 in which there is positioned a friction disk 86 having a non-circular bore for non-rotative engagement with the flattened surfaces 80 on the sleeve portion 69. A second dished spring washer 87 is positioned between the nut and disk 86. The outermost portion 88 of the shaft 63 is of further reduced diameter and is threaded externally to receive a nut 89. A second friction washer 90 is mounted on the end portion 88 of the shaft and it has a non-circular bore for engagement with the flattened sides 91 on the shaft, whereby this washer is fixed against rotation relative to the shaft. The nut 89 is tightened on the shaft against the washer 90 which abuts against the shoulder formed by the intermediate portion 66 of the shaft. With this arrangement, when the nut 84 is backed outwardly on the sleeve portion 69, frictional engagement between the disks 86, 90, is increased. The spring 71 holds the crank sleeve against reverse rotation because of the engagement of the inner end of the spring in a notch 75 in the fixed bearing sleeve. The friction washer 86 is fixed against rotation on the crank sleeve, and the washer 90 is fixed against rotation on the shaft 63. Accordingly, any reverse rotation of the shaft 63 is restrained by the frictional engagement between the washers 86, 90. This frictional engagement is conveniently varied by adjustment of the nut 84. This adjustment is made more convenient and natural by providing the threaded engagement between the nut and sleeve with a left-hand thread.

The drive mechanism is enclosed by a housing 94 formed with a cylindrical flange 95 adapted to encircle the rear end portion of the casing 56. The bottom portion of the flange 95 is notched to receive the mounting bracket 13, and a slot 96 is formed in the top portion of the flange to receive a screw 97 by which both casings 56, 94, are detachably affixed to the frame plate 10. The rear casing 94 is formed with an aperture in one side to receive a tubular member 98 which is sleeved on over the sleeve bearing 62. The upper wall of the casing 94 is formed with rearwardly projecting ears 99 to which there is pivotally connected an actuating member 100 curving rearwardly over the rear casing 94 and having an inwardly extending projection 101 for engaging the rear end of the shaft 23 for moving the same forwardly for engagement by the latch plate 29.

In use, the actuator 100 is pressed inwardly by the thumb to move the shaft 23 forwardly for engagement by the latch plate 29. In this position, the pick-up pin 46 is retracted, and the line is cast, as shown in FIGURE 3. Thereupon, the crank 70 is given a partial turn to rotate the shaft 23 sufficiently to release the latch plate 29, permitting the shaft 23 and the pickup assembly to move rearwardly, whereby the pick-up end 46 is ejected through the flange 45 of the pick-up member. If the line is taken out by a fish, imparting reverse rotation of the pick-up assembly, such reverse rotation will be resisted by the frictional connection between the disks 86, 90, which may be varied as explained above. If it is desired to stop any pay-out of the line, the line may be instantly snubbed by pressing further on the actuator 100. The discoidal portion 25 of the pick-up member is formed with a circular series of forwardly extending projections 104. These projections are arranged to engage the inner surface of the annular portion 57 of the front wall of the forward housing 56, see FIGURE 4. In order that the line will not be squeezed or compressed between the pick-up member and the forward casing, the projections 104 extend forwardly from the discoidal portion 25 of the pick-up member a distance somewhat greater than the diameter of the line, whereby the snubbing arrangement in no way injures the line even if it is of the mono-filament type formed of plastic material.

What we claim is:

1. A fishing reel comprising a frame, a spool detachably mounted in the frame and fixed against rotation, a shaft mounted in the frame coaxially of the spool for axial and rotative movement relative to the spool, said shaft extending forwardly and rearwardly of the spool, a line pick-up assembly fixedly mounted on the forward end of said shaft and including a discoidal portion, a cylindrical housing enclosing said spool and pick-up assembly and having a front wall confronting and spaced forwardly of said discoidal portion of the pick-up member, said front wall being formed with a central aperture through which a line payed off from said spool may extend, said discoidal portion being formed with a circular series of circumferentially spaced integral non-yieldable forwardly extending projections, spring means yieldingly urging said shaft rearwardly to space said projections rearwardly of said front wall, and means carried by the frame and operable to move said shaft forwardly to move said projections against said front wall for snubbing the line to prevent pay off thereof from said spool.

2. A fishing reel as defined in claim 1 wherein said projections extend forwardly from said discoidal portion a distance greater than the diameter of the line.

3. A fishing reel including a frame plate, a sleeve fixedly secured at one end to said frame plate and extending forwardly therefrom, a line spool detachably mounted coaxially on said sleeve and fixed against axial and rotative movement thereon, said sleeve extending forwardly from said spool and having a conical end portion, a shaft journalled in the sleeve and extending forwardly and rearwardly therefrom, said shaft being movable axially in said sleeve to forward and rearward positions, a line pick-up assembly including a discoidal portion detachably fixed to the forward end of said shaft and having a cylindrical flange at its periphery extending rearwardly in juxtaposition to the periphery of said spool, a line engaging member mounted on said discoidal portion for movement inwardly and outwardly through said flange, means yieldingly moving said line engaging member inwardly when said shaft is in forward position to permit a line to pay off from the spool, said line engaging member having a portion engageable with said conical end portion of said sleeve upon movement of said shaft to rearward position to move said line engaging member outwardly through said flange for picking up the line upon rotation of the pick-up assembly, spring means acting upon the rearward portion of said shaft for yieldingly urging said shaft to rearward poistion, a latch member mounted on the rear side of said frame plate for movement transversely of said shaft into and out of latching engagement therewith, a spring for moving said latch into latching engagement with said shaft when the same is moved from rearward position toward forward position, and said latch being operable in latching position to restraian rearward movement of said shaft, said shaft being formed with an eccentric surface operable upon rotation of said shaft to move said latch out of latching engagement therewith.

4. A fishing reel comprising a frame plate, a sleeve fixedly secured at one end to said frame plate and extending forwardly therefrom, a line spool detachably mounted coaxially on said sleeve and fixed against axial and rotative movement thereon, said sleeve extending forwardly from said spool and having a conical end portion, a shaft journalled in the sleeve and extending forwardly and rearwardly therefrom, said shaft being movable axially in said sleeve to forward and rearward positions, a line pick-up assembly including a discoidal portion detachably fixed to the forward end of said shaft and having a cylindrical flange at its periphery extending rearwardly in juxtaposition to the periphery of said spool, a line engaging pick-up member mounted on said discoidal portion for movement inwardly and outwardly through said flange, means yieldingly urging said pick-up member inwardly to permit a line to pay off from the spool, said line pick-up member having an inner portion engageable with said conical end portion of said sleeve when said shaft is in rearward position for moving said pick-up member outwardly through said flange for picking up the line upon rotation of said pick-up assembly, the rearward portion of said shaft being of reduced dimension to provide a shoulder rearwardly of said frame plate when said shaft is moved to rearward position, said shaft being formed contiguous to said shoulder with an eccentric portion, a plate extending transversely of said shaft and being fixedly secured to the rear side of said frame plate and having an aperture through which said shaft extends, a latch plate positioned intermediate said frame plate and said fixed plate, said latch plate being formed intermediate its ends with an aperture to receive said shaft, the one end of said latch plate being pivotally mounted whereby the intermediate apertured portion of said latch plate is movable transversely of said shaft, a first spring means mounted on the rear reduced portion of said shaft and acting to yieldingly urge said shaft to rear position, a second spring means acting on said latch plate to move the same laterally to move one side of the aperture in the latch plate radially inwardly when said shaft is moved forwardly to position said shoulder forwardly of said latch plate, means for limiting such inward lateral movement of said latch plate by said second spring means to position said aperture in said latch plate in registration with said eccentric surface whereby, upon rearward movement of said shaft to move said eccentric surface in juxtaposition with said latch plate, rotation of said shaft effects movement of said latch plate to move the aperture therein in registration with the forward portion of said shaft for rearward movement of the shaft by said first spring means.

References Cited in the file of this patent

UNITED STATES PATENTS

| | | |
|---|---|---|
| 2,668,025 | Hull | Feb. 2, 1954 |
| 2,690,310 | Hayes | Sept. 28, 1954 |
| 2,862,679 | Denison et al. | Dec. 2, 1958 |
| 2,911,165 | Sarah | Nov. 3, 1959 |
| 2,922,595 | Holahan | Jan. 26, 1960 |
| 2,926,863 | Mauborgne | Mar. 1, 1960 |
| 2,929,578 | Hull | Mar. 22, 1960 |
| 3,025,020 | Sarah | Mar. 13, 1962 |
| 3,034,741 | Macy et al. | May 15, 1962 |

FOREIGN PATENTS

| | | |
|---|---|---|
| 588,742 | Canada | Dec. 15, 1959 |
| 1,215,596 | France | Nov. 23, 1959 |
| 760,981 | Great Britain | Nov. 7, 1956 |